(12) United States Patent
Park et al.

(10) Patent No.: US 9,419,272 B2
(45) Date of Patent: Aug. 16, 2016

(54) NEGATIVE ACTIVE MATERIAL FOR RECHARGEABLE LITHIUM BATTERY, METHOD OF PREPARING SAME, AND RECHARGEABLE LITHIUM BATTERY INCLUDING SAME

(75) Inventors: Sung Soo Park, Yongin-si (KR); Yong-Sun Won, Yongin-si (KR); Jae-Hak Lee, Yongin-si (KR)

(73) Assignee: Samsung SDI Co., Ltd., Giheung-gu, Yonging-si, Gyeonggi-do (KR)

( * ) Notice: Subject to any disclaimer, the term of this patent is extended or adjusted under 35 U.S.C. 154(b) by 1077 days.

(21) Appl. No.: 13/369,495

(22) Filed: Feb. 9, 2012

(65) Prior Publication Data

US 2012/0231339 A1    Sep. 13, 2012

(30) Foreign Application Priority Data

Mar. 7, 2011 (KR) ............ 10-2011-0020033
Nov. 2, 2011 (KR) ............ 10-2011-0113484

(51) Int. Cl.
*H01M 4/88* (2006.01)
*H01M 4/134* (2010.01)
*H01M 4/58* (2010.01)

(52) U.S. Cl.
CPC ............ *H01M 4/134* (2013.01); *H01M 4/58* (2013.01); *Y02E 60/122* (2013.01); *Y02P 70/54* (2015.11)

(58) Field of Classification Search
CPC ......... H01M 4/40; H01M 4/58; H01M 4/134; H01M 4/625; Y02E 60/122; C01B 33/06
USPC ................ 252/182.1; 429/218.1, 219, 221; 320/135
See application file for complete search history.

(56) References Cited

U.S. PATENT DOCUMENTS

| | | | |
|---|---|---|---|
| 5,556,721 A | 9/1996 | Sasaki et al. | |
| 2003/0129497 A1 | 7/2003 | Yamamoto et al. | |
| 2004/0126659 A1* | 7/2004 | Graetz et al. ............ | 429/218.1 |
| 2005/0214646 A1 | 9/2005 | Kubota | |
| 2005/0237029 A1* | 10/2005 | Takezawa et al. ........... | 320/135 |
| 2008/0160409 A1 | 7/2008 | Ishida et al. | |
| 2009/0004564 A1* | 1/2009 | Ishida et al. ................ | 429/219 |
| 2009/0047577 A1 | 2/2009 | Iwamoto et al. | |

FOREIGN PATENT DOCUMENTS

| | | | | |
|---|---|---|---|---|
| JP | 07-029602 | * | 1/1995 | ............ H01M 10/40 |
| JP | 7-29602 A | | 1/1995 | |
| JP | 2003-77461 A | | 3/2003 | |
| JP | 2005-235734 A | | 9/2005 | |
| KR | 10-0816604 B1 | | 3/2008 | |
| WO | 2007063765 A1 | | 6/2007 | |

* cited by examiner

Primary Examiner — Khanh Tuan Nguyen
(74) Attorney, Agent, or Firm — Robert E. Bushnell, Esq.

(57) ABSTRACT

Disclosed are a negative active material for a rechargeable lithium battery including lithium silicide having a I41-a crystalline phase structure, a method of manufacturing the same, and a rechargeable lithium battery including the same.

13 Claims, 3 Drawing Sheets

NEGATIVE ACTIVE MATERIAL FOR RECHARGEABLE LITHIUM BATTERY, METHOD OF PREPARING SAME, AND RECHARGEABLE LITHIUM BATTERY INCLUDING SAME

CROSS-REFERENCE TO RELATED APPLICATIONS

This application claims priority to and the benefit of Korean Patent Application Nos. 10-2011-0020033 and 10-2011-0113484 filed in the Korean Intellectual Property Office on Mar. 7, 2011, and Nov. 2, 2011, respectively, the entire contents of which are incorporated herein by reference.

BACKGROUND

1. Field

This disclosure relates to a negative active material for a rechargeable lithium battery, a method of manufacturing the same, and a rechargeable lithium battery including the same.

2. Description of the Related Art

Batteries generate electric power using electrochemical reaction materials (referred to hereinafter simply as an "active material") for a positive electrode and a negative electrode. Lithium rechargeable batteries generate electrical energy from changes of chemical potential during the intercalation/deintercalation of lithium ions at the positive and negative electrodes.

Lithium rechargeable batteries use materials that reversibly intercalate or deintercalate lithium ions during charge and discharge reactions for both positive and negative active materials, and contain an organic electrolyte or a polymer electrolyte between the positive electrode and the negative electrode.

For a positive active material for a rechargeable lithium battery, composite metal oxides such as $LiCoO_2$, $LiMn_2O_4$, $LiNiO_2$, $LiNi_{1-x}Co_xO_2$ ($0<x<1$), $LiMnO_2$, and the like have been researched.

For a negative active material of a rechargeable lithium battery, various carbon-based materials such as artificial graphite, natural graphite, and hard carbon, which can intercalate and deintercalate lithium ions, have been used. Since graphite among the carbon-based materials has a low discharge potential relative to lithium of −0.2V, a battery using the graphite as a negative active material has a high discharge potential ranging from 3.6V and excellent energy density. Furthermore, the graphite guarantees a long cycle life for a battery due to its outstanding reversibility. However, a graphite active material has low density about 1.6 g/cc and consequently low capacity in terms of energy density per unit volume when the graphite is used as a negative active material.

Therefore, recently a high-capacity negative active material that can replace a graphite active material has been researched.

SUMMARY

One embodiment provides a negative active material for a rechargeable lithium battery including lithium silicide having a I41-a crystalline phase structure.

Another embodiment provides a method of manufacturing the negative active material for a rechargeable lithium battery.

Yet another embodiment provides a rechargeable lithium battery including the negative active material for a rechargeable lithium battery.

According to one embodiment, a negative active material for a rechargeable lithium battery including lithium silicide having a I41-a crystalline phase structure is provided.

The lithium silicide having a I41-a crystalline phase structure may include a compound represented by the following Chemical Formula 1.

$$Li_xSi \qquad \text{[Chemical Formula 1]}$$

In Chemical Formula 1,

00<x≤4.4, and specifically 0<x≤1.5.

The lithium silicide having a I41-a crystalline phase structure may maintain the I41-a crystalline phase structure after the charge and discharge.

The negative active material for a rechargeable lithium battery may further include the lithium silicide having a I41-a crystalline phase structure in an amount of greater than or equal to about 2 wt % based on the total weight of the negative active material.

On the other hand, the negative active material for a rechargeable lithium battery may further include a carbon-based material. Herein, the carbon-based material may be included in an amount ranging from about 1 wt % to about 98 wt % based on the total weight of a negative active material including the carbon-based material.

The negative active material for a rechargeable lithium battery may further include Si, $Li_{12}Si_7$, $Li_2Si_1$, $Li_7Si_3$, $Li_7Si_2$, $Li_{15}Si_4$, $Li_{22}Si_4$, or a combination thereof.

According to another embodiment, provided is a negative active material for a rechargeable lithium battery, the negative active material including lithium silicide manufactured by mixing lithium and silicon and milling the mixture, compacting the mixture, and heat-treating the compacted mixture to manufacture the lithium silicide with a I41-a crystalline phase structure.

According to another embodiment, provided is a method of manufacturing a negative active material for a rechargeable lithium battery, which includes mixing lithium and silicon and milling the mixture; compacting the mixture; and heat-treating the compacted mixture at a high temperature and a high pressure. Herein, the negative active material for a rechargeable lithium battery includes lithium silicide having a I41-a crystalline phase structure.

The lithium may be included in an amount of greater than or equal to about 100 moles by part based on 100 moles by part of the silicon and specifically about 100 moles by part to about 200 moles by part.

The milling may be performed at a temperature ranging from about 300° C. to about 450° C.

The heat treatment may be performed at a temperature ranging from about 500° C. to about 700° C. under a pressure ranging from about 1 GPa to about 2.5 GPa.

The negative active material for a rechargeable lithium battery may further include a carbon-based material. Herein, the carbon-based material may be included in an amount ranging from about 1 wt % to about 98 wt % based on the total weight of the negative active material including the carbon-based material.

According to yet another embodiment, provided is a rechargeable lithium battery that includes a negative electrode including the negative active material, a positive electrode including a positive active material, and an electrolyte.

The positive active material may include an oxide of a metal selected from cobalt, iron, manganese, nickel, molybdenum, and a combination thereof.

Hereinafter, further embodiments of this disclosure will be described in detail.

The negative active material for a rechargeable lithium battery according to one embodiment of the present invention includes lithium silicide having a I41-a crystalline phase structure and thus, has excellent capacity characteristic, small volume change during the charge and discharge and thus, excellent cycle-life characteristics, and less irreversible capacity.

DETAILED DESCRIPTION

Exemplary embodiments of the present invention will hereinafter be described in detail referring to the following accompanied drawings, and can be easily performed by those who have common knowledge in the related art. However, these embodiments are only exemplary, and the present invention is not limited thereto.

In the drawings, the thickness of layers, films, panels, regions, etc., are exaggerated for clarity. Like reference numerals designate like elements throughout the specification.

It will be understood that when an element such as a layer, film, region, or substrate is referred to as being "on" another element, it can be directly on the other element or intervening elements may also be present. In contrast, when an element is referred to as being "directly on" another element, there are no intervening elements present.

According to one embodiment, a negative active material for a rechargeable lithium battery including lithium silicide having a I41-a crystalline phase structure is provided.

Figure 1:
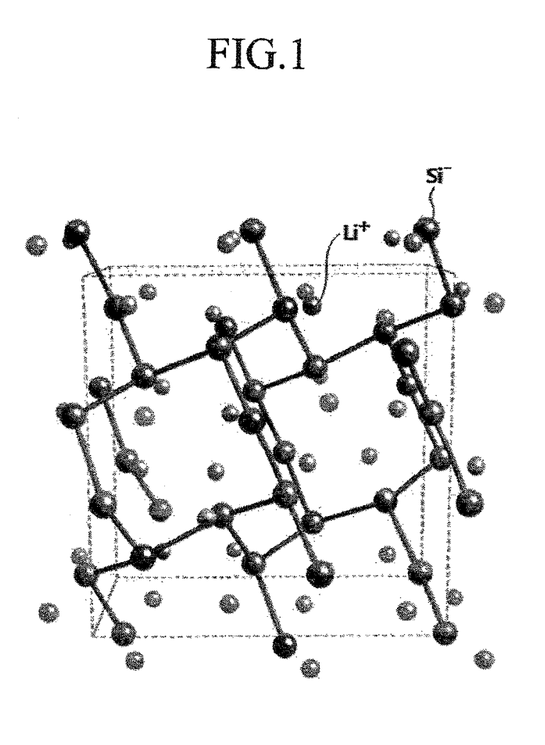
FIG. 1 shows the molecular crystal structure of lithium silicide with a I41-a crystalline phase.

For example, FIG. 1 shows the molecular crystal structure of the lithium silicide having a I41-a crystalline phase structure.

Referring to FIG. 1, the lithium silicide having a I41-a crystalline phase structure has a structure of filling $Li^+$ in an empty space in a Si-network and still maintain a crystalline phase even though the lithium ion ($Li^+$) deintercalates therefrom. In addition, the lithium silicide having a I41-a crystalline phase structure has large electrochemical capacity. Accordingly, the negative active material for a rechargeable lithium battery including lithium silicide having a I41-a crystalline phase structure may have small volume expansion and contraction despite repeated charges and discharges and stably maintain a crystal structure and have excellent cycle-life characteristics and excellent capacity characteristics.

In addition, the negative active material for a rechargeable lithium battery including lithium silicide having a I41-a crystalline phase structure is a little contracted in its volume during discharge and a little expanded in its volume during the charge, has a small difference between the amount of lithium released during the discharge and the amount of lithium entering during the charge and thus, decrease irreversible capacity, improving efficiency of a rechargeable lithium battery.

The lithium silicide having a I41-a crystalline phase structure may include a compound represented by the following Chemical Formula 1.

$Li_xSi$ [Chemical Formula 1]

In Chemical Formula 1, $0<x\leq4.4$, for example, $0<x\leq1.5$, and for another example, $0<x\leq1.1$. For another example, x may be 1.0.

The lithium silicide having a I41-a crystalline phase structure may maintain the I41-a crystalline phase structure after the charge and discharge. Accordingly, the negative active material for a rechargeable lithium battery including lithium silicide having a I41-a crystalline phase structure has small volume expansion and contraction despite repeated charge and discharge and thus, may have excellent cycle-life characteristics.

The negative active material for a rechargeable lithium battery may further include a carbon-based material. When the negative active material further includes the carbon-based material, conductive and cycle-life characteristics of the negative active material for a rechargeable lithium battery may be improved.

When the negative active material for a rechargeable lithium battery include the lithium silicide having a I41-a crystalline phase structure and the carbon-based material, the amount of the lithium silicide having a I41-a crystalline phase structure in an amount of greater than or equal to about 2 wt % based on the total weight of the negative active material for a rechargeable lithium battery. When the lithium silicide having a I41-a crystalline phase structure is included within the range, the lithium silicide may effectively relieve volume expansion and contraction of a negative active material for a rechargeable lithium battery despite repeated charges and discharges and effectively improve cycle-life characteristic of a rechargeable lithium battery. According to one embodiment of the present invention, the negative active material for a rechargeable lithium battery may include the lithium silicide having a I41-a crystalline phase structure in an amount ranging from about 2 wt % to about 99 wt % based on the total weight of the negative active material for a rechargeable lithium battery, about 5 wt % to about 50 wt % in another embodiment, about 10 wt % to about 30 wt % in yet another embodiment, about 10 wt % to about 25 wt % in still another embodiment, and about 20 wt % to about 25 wt % in further another embodiment.

The carbon-based material may be any generally-used carbon-based negative active material in a rechargeable lithium battery. Examples of the carbon-based material may include crystalline carbon, amorphous carbon, or a combination thereof. The crystalline carbon may be non-shaped, or may be sheet, flake, spherical, or fiber shaped natural graphite or artificial graphite. The amorphous carbon may be a soft carbon, a hard carbon, mesophase pitch carbonized products, fired coke, and the like.

The negative active material for a rechargeable lithium battery may include the carbon-based material in an amount ranging from about 1 wt % to about 98 wt % based on the total weight of the negative active material including the carbon-based material. When the carbon-based material is included within the range, the carbon-based material may effectively improve conductive and cycle-life characteristics of the negative active material for a rechargeable lithium battery. According to one embodiment of the present invention, the negative active material for a rechargeable lithium battery may include the carbon-based material in an amount ranging from about 6-50 wt % to about 95 wt % based on the total weight of the negative active material including the carbon-based material but about 70 wt % to about 90 wt % in another embodiment, about 75 wt % to about 90 wt % in still another embodiment, and about 75 wt % to about 80 wt % in another embodiment.

The negative active material for a rechargeable lithium battery may further include Si, $Li_{12}Si_7$, $Li_2Si_1$, $Li_7Si_3$, $Li_7Si_2$, $Li_{15}Si_4$, $Li_{22}Si_4$, or a combination thereof in addition to the lithium silicide having a I41-a crystalline phase structure. The amount thereof maybe 10 parts by weight to 30 parts by weight based on 100 parts by weight of the negative active material.

According to another embodiment of the present invention, a method of manufacturing a negative active material including the lithium silicide having a I41-a crystalline phase structure include mixing lithium and silicon, and milling the mixture; compacting the mixture; and heat-treating the compacted mixture at a high temperature and a high voltage.

When the lithium and the silicon are mixed, the lithium may have a sheet shape, and the silicon may have a powder-type, but is not limited thereto.

Herein, the lithium may be included in an amount of greater than or equal to about 100 moles by part based on 100 moles by part of the silicon. When the lithium and the silicon are used within the range, the lithium and the silicon may effectively form lithium silicide with a I41-a crystalline phase structure. In particular, the lithium may be included in an amount ranging from about 100 moles by part to about 200 moles by part based on 100 moles by part of the silicon.

The milling may be performed in a common method for mixing and grinding materials and in particular, using a ball but is not limited thereto.

The milling may be performed at a temperature ranging from about 300° C. to about 450° C. When the milling is performed within the temperature range, the lithium and the silicon may be easily mixed.

The milling may be performed, for example, using a piston cylinder equipment but is not limited thereto.

The heat treatment may be performed at a high temperature, for example ranging from about 500° C. to about 700° C. and a high temperature, for example, under a pressure ranging from about 1 GPa to about 2.5 GPa. When the heat treatment is performed within the range, lithium silicide having a I41-a crystalline phase structure may be effectively formed.

The method of manufacturing the negative active material for a rechargeable lithium battery may include addition of a carbon-based material after the heat treatment.

Hereinafter, the carbon-based material may be illustrated as aforementioned.

In particular, the carbon-based material may be included in an amount ranging from about 1 wt % to about 98 wt % based on the total weight of the negative active material including the carbon-based material. When the carbon-based material is included within the range, the negative active material for a rechargeable lithium battery may have improved conductive and cycle-life characteristics. According to one embodiment of the present invention, the carbon-based material may be included in an amount ranging from about 10 wt % to about 95 wt % based on the total weight of the negative active material including the carbon-based material and in particular, about 30 wt % to about 95 wt % in another embodiment, about 50 wt % to about 95 wt % in yet another embodiment, and about 70 wt % to about 90 wt % in still another embodiment.

The method prepares a negative active material for a rechargeable lithium battery according to one embodiment of the present invention.

The rechargeable lithium battery according to another embodiment includes a negative electrode including the negative active material; a positive electrode; and an electrolyte.

Figure 2:
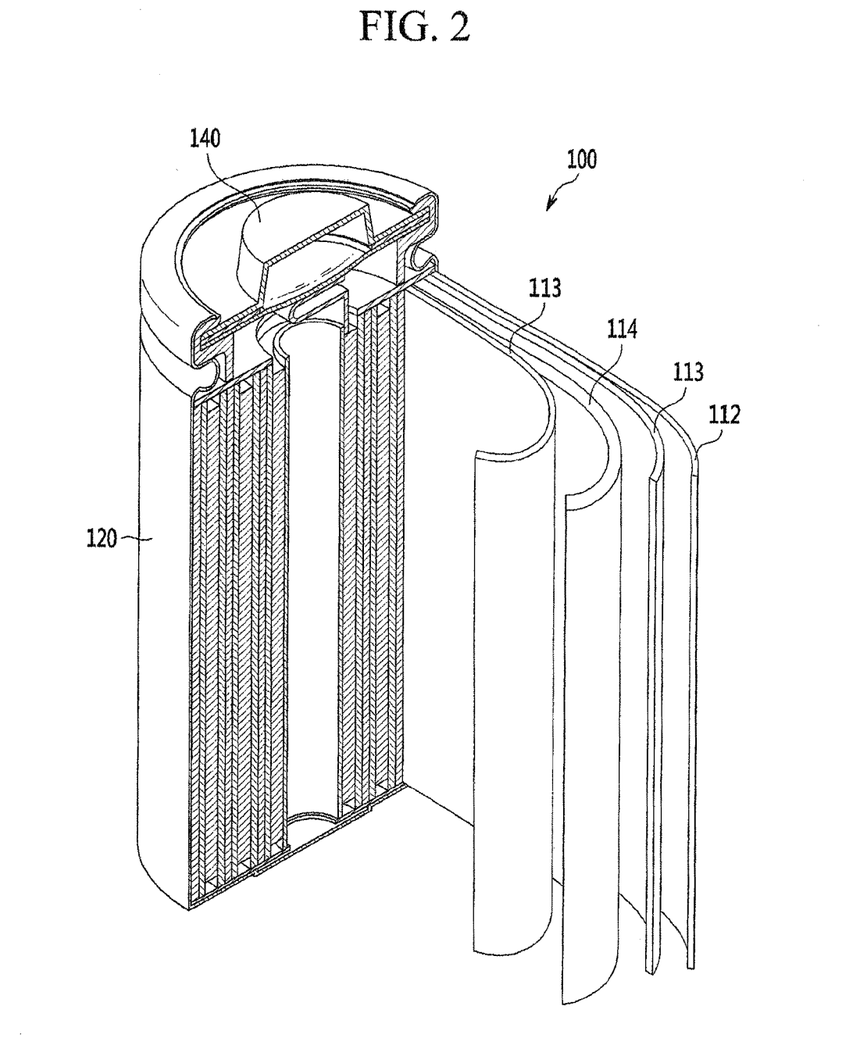
FIG. 2 is a schematic view showing the structure of a rechargeable lithium battery according to one embodiment of the present invention.

FIG. 2 is a schematic view showing a rechargeable lithium battery according to one embodiment.

FIG. 2 shows a cylindrical rechargeable lithium battery, but a rechargeable lithium battery is not limited thereto bur have various shapes such as a prism, a coin, a pouch, and the like.

Referring to FIG. 2, the rechargeable lithium battery 100 according to one embodiment includes an electrode group including a positive electrode 114, a negative electrode 112, and a separator 113 interposed between the positive electrode 114 and negative electrode 112, and, a battery case 120 housing the electrode group, an electrolyte (not shown) impregnating the positive electrode 114, negative electrode 112 and separator 113, and a sealing member 140 sealing the battery case 120.

The negative electrode 112 includes a negative active material layer including the negative active material according to one embodiment and a negative current collector supporting the same.

The negative active material layer may include about 80 wt % to about 99 wt % of a negative active material based on the total weight of the negative active material layer, and in particular, about 95 wt % to about 99 wt %.

The negative active material layer includes a binder and optionally, a conductive material. The binder may be included in an amount ranging from about 1 wt % to about 20 wt % based on the total weight of the negative active material layer and in particular, about 1 wt % to about 5 wt %. In addition, when the conductive material is further included, a negative active material may be included in an amount of about 80 wt % to about 98 wt %, while a binder is included in an amount ranging from about 1 wt % to about 10 wt %, and a conductive material may be included in an amount ranging from about 1 wt % to about 10 wt %. In particular, the negative active material may be included in an amount ranging from about 90 wt % to about 98 wt %, a binder in an amount ranging from about 1 wt % to about 5 wt %, and a conductive material in an amount ranging from about 1 wt % to about 5 wt %.

The binder improves binding properties of negative active material particles with one another and with a current collector. Examples of the binder include polyvinylalcohol, carboxylmethylcellulose (CMC), hydroxypropylcellulose, diacetylcellulose, polyvinylchloride, carboxylated polyvinylchloride, polyvinylfluoride, an ethyleneoxide-containing polymer, polyvinylpyrrolidone, polyurethane, polytetrafluoroethylene, polyvinylidenefluoride, polyethylene, polypropylene, a styrene-butadiene rubber (SBR), an acrylated styrene-butadiene rubber, an epoxy resin, nylon, and the like, but are not limited thereto.

The conductive material improves electrical conductivity of a negative electrode. Any electrically conductive material may be used as the conductive material, unless it causes a chemical change. Examples of the conductive material include a carbon-based material such as natural graphite, artificial graphite, carbon black, acetylene black, ketjen black, a carbon fiber, and the like; a metal-based material of a metal powder or a metal fiber including copper, nickel, aluminum, silver or the like; a conductive polymer such as a polyphenylene derivative, and the like; or a mixture thereof.

The examples of the current collector include a copper foil, a nickel foil, a stainless steel foil, a titanium foil, a nickel foam, a copper foam, a polymer substrate coated with a conductive metal, or combinations thereof, but are not limited thereto.

The positive electrode 114 may include a positive current collector and a positive active material layer formed on the positive current collector. The positive active material may include lithiated intercalation compounds that reversibly intercalate and deintercalate lithium ions.

The positive active material may include at least one selected from an oxide compound of transition elements; and a composite compound of transition elements and lithium, but is not limited thereto.

Examples of the positive active material include a compound of a metal selected from cobalt, iron, manganese, nickel, molybdenum, and a combination thereof; a composite compound including a metal selected from cobalt, iron, manganese, nickel, molybdenum, and a combination thereof, and lithium, but are not limited thereto.

For example, the positive active material may include a compound of a metal selected from cobalt, iron, manganese, nickel, molybdenum, titanium, and a combination thereof that does not include lithium. The negative active material for a rechargeable lithium battery according to one embodiment includes sufficient lithium therein, and therefore a rechargeable lithium battery may be effectively operated although the positive active material does not include lithium.

Specific examples of the positive active material may include compounds represented by the following Chemical Formulas.

$Li_aA_{1-b}X_bD_2$ ($0.90 \leq a \leq 1.8$, $0 \leq b \leq 0.5$), $Li_aE_{1-b}X_bO_{2-c}D_c$ ($0.90 \leq a \leq 1.8$, $0 \leq b \leq 0.5$, $0 \leq c \leq 0.05$), $LiE_{2-b}X_bD_4$ ($0 \leq b \leq 0.5$), $LiE_{2-b}X_bO_{4-c}D_c$ ($0 \leq b \leq 0.5$, $0 \leq c \leq 0.05$), $Li_aNi_{1-b-c}Co_bX_cD_\alpha$ ($0.90 \leq a \leq 1.8$, $0 \leq b \leq 0.5$, $0 \leq c \leq 0.05$, $0 < \alpha \leq 2$), $Li_aNi_{1-b-c}Co_bX_cO_{2-\alpha}T_\alpha$ ($0.90 \leq a \leq 1.8$, $0 \leq b \leq 0.5$, $0 \leq c \leq 0.05$, $0 < \alpha \leq 2$), $Li_aNi_{1-b-c}Co_bX_cO_{2-\alpha}T_2$ ($0.90 \leq a \leq 1.8$, $0 \leq b \leq 0.5$, $0 \leq c \leq 0.05$, $0 < \alpha < 2$), $Li_aNi_{1-b-c}Mn_bX_cD_\alpha$ ($0.90 \leq a \leq 1.8$, $0 \leq b \leq 0.5$, $0 \leq c \leq 0.05$, $0 < \alpha \leq 2$), $Li_aNi_{1-b-c}Mn_bX_cO_{2-\alpha}T_\alpha$ ($0.90 \leq a \leq 1.8$, $0 \leq b \leq 0.5$, $0 \leq c \leq 0.05$, $0 < \alpha < 2$), $Li_aNi_{1-b-c}Mn_bX_cO_{2-\alpha}T_2$ ($0.90 \leq a \leq 1.8$, $0 \leq b \leq 0.5$, $0 \leq c \leq 0.05$, $0 < \alpha < 2$), $Li_aNi_bE_cG_dO_2$ ($0.90 \leq a \leq 1.8$, $0 \leq b \leq 0.9$, $0 \leq c \leq 0.5$, $0.001 \leq d \leq 0.1$), $Li_aNi_bCo_cMn_dGeO_2$ ($0.90 \leq a \leq 1.8$, $0 \leq b \leq 0.9$, $0 \leq c \leq 0.5$, $0 \leq d \leq 0.5$, $0.001 \leq e \leq 0.1$), $Li_aNiG_bO_2$ ($0.90 \leq a \leq 1.8$, $0.001 \leq b \leq 0.1$), $Li_aCoG_bO_2$ ($0.90 \leq a \leq 1.8$, $0.001 \leq b \leq 0.1$), $Li_aMnG_bO_2$ ($0.90 \leq a \leq 1.8$, $0.001 \leq b \leq 0.1$), $Li_aMn_2G_bO_4$ ($0.90 \leq a \leq 1.8$, $0.001 \leq b \leq 0.1$), $QO_k$ ($1 \leq k \leq 3$), $QS_w$ ($1 \leq w \leq 3$), $LiQS_2$, $V_2O_5$, $LiV_2O_5$, $LiIO_2$, $LiNiVO_4$, $Li_{(3-f)}J_2(PO_4)_3$ ($0 \leq f \leq 2$), $Li_{(3-f)}Fe_2(PO_4)_3$ ($0 \leq f \leq 2$), and $LiFePO_4$.

In Chemical Formulas,

A is selected from the group consisting of Ni, Co, Mn, and a combination thereof;

X is selected from the group consisting of Al, Ni, Co, Mn, Cr, Fe, Mg, Sr, V, a rare earth element, and a combination thereof;

D is selected from the group consisting of O, F, S, P, and a combination thereof;

E is selected from the group consisting of Co, Mn, and a combination thereof;

T is selected from the group consisting of F, S, P, and a combination thereof;

G is selected from the group consisting of Al, Cr, Mn, Fe, Mg, La, Ce, Sr, V, and a combination thereof;

Q is selected from the group consisting of Ti, Co, Mo, Mn, and a combination thereof, I is selected from the group consisting of Cr, V, Fe, Sc, Y, and a combination thereof; and J is selected from the group consisting of V, Cr, Mn, Co, Ni, Cu, and a combination thereof.

The positive active material may include the positive active material with a coating layer, or the active material mixed with the active material with the coating layer.

The coating layer may include at least one compound selected from the group consisting of an oxide of a coating element, a hydroxide of the coating element, an oxyhydroxide of the coating element, an oxycarbonate of the coating element, and a hydroxycarbonate of the coating element. The compound for the coating layer may be either amorphous or crystalline. The coating element included in the coating layer may be Mg, Al, Co, K, Na, Ca, Si, Ti, V, Sn, Ge, Ga, B, As, Zr, or a mixture thereof. The coating process may include any conventional processes (e.g., spray coating, immersing) as long as it does not cause any side effects on the properties of the positive active material, which is well known to persons having ordinary skill in this art, so a detailed description thereof is omitted.

The positive active material layer may also include a binder and a conductive material.

The binder improves binding properties of the positive active material particles to each other and to a current collector. Examples of the binder include polyvinylalcohol, carboxylmethylcellulose, hydroxypropylcellulose, diacetylcellulose, polyvinylchloride, carboxylated polyvinylchloride, polyvinylfluoride, an ethylene oxide-containing polymer, polyvinylpyrrolidone, polyurethane, polytetrafluoroethylene, polyvinylidenefluoride, polyethylene, polypropylene, a styrene-butadiene rubber, an acrylated styrene-butadiene rubber, epoxy a resin, nylon, a mixture thereof, and the like, but are not limited thereto.

The conductive material improves electrical conductivity of a negative electrode. Any electrically conductive material can be used as the conductive material unless it causes a chemical change. Examples of the conductive material include a carbon-based material such as natural graphite, artificial graphite, carbon black, acetylene black, ketjen black, a carbon fiber, and the like; a metal powder or metal fiber of copper, nickel, aluminum, silver, and the like; a conductive polymer such as a polyphenylene derivative; or a mixture thereof.

The positive current collector may include aluminum (Al), but is not limited thereto.

The negative electrode 112 and the positive electrode 114 may be fabricated by a method including mixing each active material, a binder, and a conductive material to provide an active material slurry, and coating the active material slurry on a current collector. The electrode manufacturing method is well known, and thus is not described in detail in the present specification. The solvent includes N-methylpyrrolidone, deionized water, and the like, but is not limited thereto.

In a rechargeable lithium battery according to one embodiment, an electrolyte includes a non-aqueous organic solvent and a lithium salt. Alternatively, the electrolyte may not include a lithium salt.

The negative active material for a rechargeable lithium battery according to one embodiment includes sufficient lithium therein, and therefore a rechargeable lithium battery can be effectively operated although the electrolyte does not include a lithium salt.

The non-aqueous organic solvent serves as a medium for transmitting ions taking part in the electrochemical reaction of a battery.

The non-aqueous organic solvent may include a carbonate-based, ester-based, ether-based, ketone-based, alcohol-based, or aprotic solvent. Examples of the carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and the like. Examples of the ester-based solvent may include methyl acetate, ethyl acetate, n-propyl acetate, dimethylacetate, methylpropionate, ethylpropionate, γ-butyrolactone, decanolide, valerolactone, mevalonolactone, caprolactone, and the like. Examples of the ether-based solvent include dibutyl ether, tetraglyme, diglyme, dimethoxyethane, 2-methyltetrahydrofuran, tetrahydrofuran, and the like, and examples of the ketone-based solvent include cyclohexanone and the like. Examples of the alcohol-based solvent include ethyl alcohol, isopropyl alcohol, and the like, and examples of the aprotic solvent include nitriles such as R—CN (where R is a C2 to C20 linear, branched, or cyclic hydrocarbon group that may include a double bond aromatic ring or an ether bond), amides such as dimethylformamide, dioxolanes such as 1,3-dioxolane, sulfolanes, and the like.

The non-aqueous organic solvent may be used singularly or in a mixture. When the organic solvent is used in a mixture, the mixture ratio can be controlled in accordance with a desirable battery performance.

The carbonate-based solvent may include a mixture of a cyclic carbonate and a linear carbonate. The cyclic carbonate and the linear carbonate are mixed together in a volume ratio of about 1:1 to about 1:9. When the mixture is used as an electrolyte, the electrolyte performance may be enhanced.

In addition, the non-aqueous organic electrolyte may further include the mixture of a carbonate-based solvent and an aromatic hydrocarbon-based solvent. The carbonate-based solvent and the aromatic hydrocarbon-based solvent may be mixed together in a volume ratio ranging from about 1:1 to about 30:1.

The aromatic hydrocarbon-based organic solvent may be represented by the following Chemical Formula 2.

[Chemical Formula 2]

In Chemical Formula 2,
$R^1$ to $R^6$ are the same or different, and each independently selected from hydrogen atom, a halogen, a C1 to C10 alkyl group, a haloalkyl group, and a combination thereof.

The aromatic hydrocarbon-based organic solvent may include, but is not limited to, at least one selected from benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and a combination thereof.

The non-aqueous electrolyte may further include vinylene carbonate, an ethylene carbonate-based compound of the following Chemical Formula 3, or a combination thereof in order to improve cycle life.

[Chemical Formula 3]

In Chemical Formula 3,
$R^7$ and $R^8$ are the same or different and are independently selected from hydrogen, a halogen, a cyano group (CN), a nitro group ($NO_2$), and a fluorinated C1 to C5 alkyl group, provided that at least one of $R^7$ and $R^8$ is selected from a halogen, a cyano group (CN), a nitro group ($NO_2$), and a fluorinated C1 to C5 alkyl group, and both $R^7$ and $R^8$ are not hydrogen.

Examples of the ethylene carbonate-based compound include difluoro ethylenecarbonate, chloroethylene carbonate, dichloroethylene carbonate, bromoethylene carbonate, dibromoethylene carbonate, nitroethylene carbonate, cyanoethylene carbonate, or fluoroethylene carbonate. The use amount of the additive for improving the cycle life may be adjusted within an appropriate range.

The lithium salt is dissolved in an organic solvent, supplies lithium ions in the battery, operates the basic operation of a rechargeable lithium battery, and improves lithium ion transport between positive and negative electrodes. Examples of the lithium salt include at least one supporting salt selected from $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$, (where x and y are natural numbers), LiCl, LiI, and $LiB(C_2O_4)_2$ (lithium bis(oxalato) borate, LiBOB). The lithium salt may be used in a concentration ranging from about 0.1M to about 2.0M. When the lithium salt is included in the above concentration range, electrolyte performance and lithium ion mobility may be enhanced due to optimal electrolyte conductivity and viscosity.

The separator 113 may include polyethylene, polypropylene, polyvinylidene fluoride, and multi-layers thereof, such as a polyethylene/polypropylene double-layered separator, a polyethylene/polypropylene/polyethylene triple-layered separator, and a polypropylene/polyethylene/polypropylene triple-layered separator.

Rechargeable lithium batteries may be classified as lithium ion batteries, lithium ion polymer batteries, and lithium polymer batteries, according to the presence of a separator and the kind of electrolyte used in the battery. The rechargeable lithium batteries may have a variety of shapes and sizes, and include cylindrical, prismatic, or coin-type batteries, and may be thin film batteries or may be rather bulky in size. Structures and fabricating methods for lithium ion batteries pertaining to this disclosure are well known in the art.

The following examples illustrate the present invention in more detail. These examples, however, should not in any sense be interpreted as limiting the scope of this disclosure.

EXAMPLE

Example 1

Preparation of Negative Active Material for Rechargeable Lithium Battery 1.39 g (0.2 mol) of sheet-shaped lithium and 2.81 g (0.1 mol) of silicon powder were put in a $ZrO_2$ crucible, and the mixture was ball-milled at 400° C.

Next, the mixture was compacted using a piston cylinder equipment.

The compacted mixture was heat-treated at 650° C. under a pressure of 1.5 GPa, preparing a negative active material for a rechargeable lithium battery. The negative active material for a rechargeable lithium battery included lithium silicide represented by LiSi with a I41-a crystalline phase structure.

Example 2

Fabrication of Half Cell

The negative active material for a rechargeable lithium battery according to Example 1, super P carbon black, and a mixed binder prepared by mixing styrene-butadiene rubber (SBR) and carboxylmethylcellulose (CMC) in a weight ratio of 1:1 were mixed in a weight ratio of 90:5:5 in an N-methyl pyrrolidone solvent, preparing negative active material slurry. The negative active material slurry was coated on a 50 μm-thick copper foil, dried at 150° C. for 20 minutes, and roll-pressed, fabricating a negative electrode.

The negative electrode was used with a lithium counter electrode, a microporous polyethylene separator, and an electrolyte together in a globe box filled with helium to fabricate a coin-type half cell (2016 R-type half cell). The electrolyte was prepared by mixing ethylene carbonate and dimethyl carbonate in a volume ratio of 50:50 and dissolving 1 M LiPF$_6$ in the mixed solvent.

Example 3

Preparation of Negative Active Material for Rechargeable Lithium Battery 1.39 g (0.2 mol) of sheet-shaped lithium and 2.81 g (0.1 mol) of silicon powder were put in a ZrO$_2$ crucible, and the mixture was ball-milled at 400° C.

Next, the mixture was compacted using a piston cylinder equipment.

The compacted mixture was heat-treated at 650° C. under a pressure of 1.5 GPa.

Then, 14.7 g of natural graphite was added to the heat-treated mixture, preparing a negative active material for a rechargeable lithium battery.

The negative active material for a rechargeable lithium battery included lithium silicide represented by LiSi with a I41-a crystalline phase structure and natural graphite in a weight ratio of 20:70.

Example 4

Fabrication of Half Cell

A coin-type half cell (2016 R-type half cell) was fabricated according to the same method as Example 2 except for using the negative active material according to Example 3 instead of the negative active material according to Example 1.

Example 5

Preparation of Negative Active Material for Rechargeable Lithium Battery 1.39 g (0.2 mol) of sheet-shaped lithium and 2.81 g (0.1 mol) of silicon powder were put in a ZrO$_2$ crucible, and the mixture was ball-milled at 400° C.

Next, the mixture was compacted using a piston cylinder equipment.

The compacted mixture was heat-treated at 650° C. under a pressure of 1.5 GPa.

4.2 g of the heat-treated mixture was mixed with 31.54 g of natural graphite, preparing a negative active material for a rechargeable lithium battery.

The negative active material for a rechargeable lithium battery included lithium silicide represented by LiSi with a I41-a crystalline phase structure and natural graphite.

Example 6

Fabrication of Half Cell

A coin-type half cell (2016 R-type half cell) was fabricated according to the same method as Example 2 except for using the negative active material according to Example 5 instead of the negative active material according to Example 1.

Experimental Example 1

Cycle-Life Characteristic

The coin-type half cells according to Examples 2, 4, and 6 were respectively charged and discharged at a 0.5 C-rate at 60° C. between 3.0 V to 4.5 V for 35 cycles and measured regarding charge capacity change, discharge capacity change, and coulomb efficiency (charge/discharge efficiency, C/D efficiency).

Figure 3:
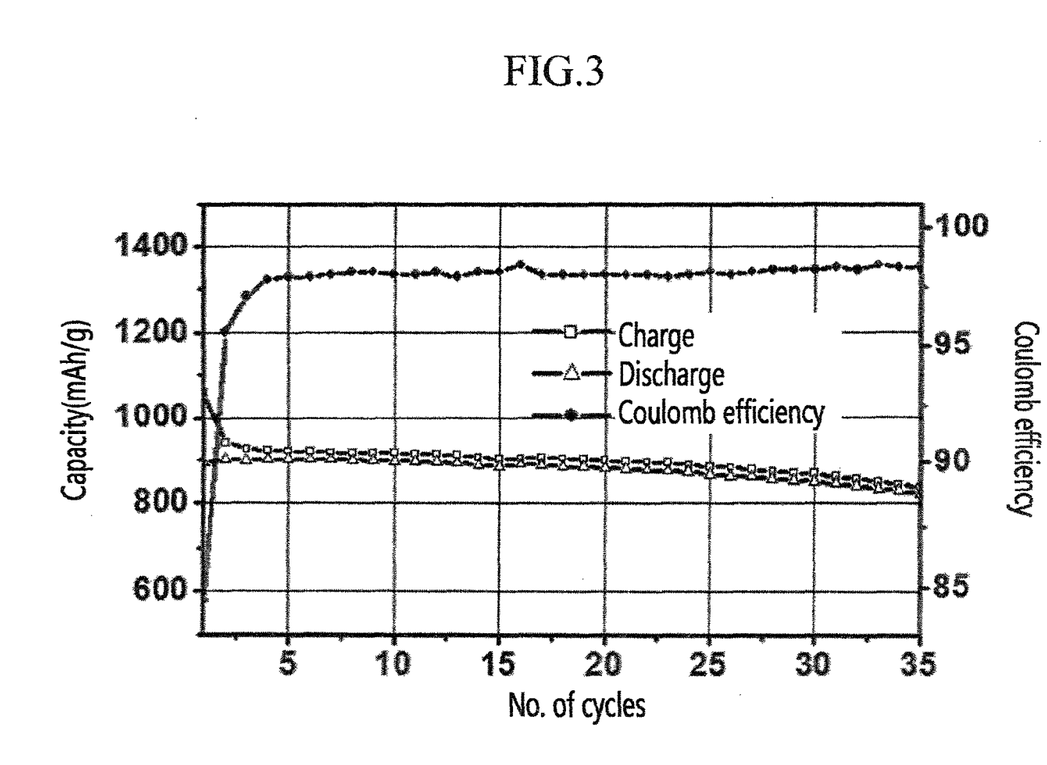
FIG. 3 shows a graph showing charge capacity, discharge capacity, and coulomb efficiency changes depending on cycle numbers of a rechargeable lithium battery according to Example 4.

The result of Example 4 is provided in FIG. 3.

In addition, the following Table 1 provides initial discharge capacity, cycle-life retention rate and discharge capacity after 35 cycles, and of the coin-type half cell according to Example 4.

TABLE 1

| | Initial discharge capacity (mAh/g) | Discharge capacity after 35 cycles (mAh/g) | Cycle-life retention rate (%) |
|---|---|---|---|
| Example 4 | 900 | 800 | 89 |

As shown in FIG. 3 and the Table 1, the coin-type half cell according to Example 4 had excellent cycle-life characteristic.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A negative active material for a rechargeable lithium battery, the negative active material comprising lithium silicide and a carbon-based material, said lithium silicide consisting of a I41-a crystalline phase structure,
    wherein the lithium silicide consisting of a I41-a crystalline phase structure is included in an amount of greater than or equal to 5 wt % and less than or equal to 50 wt % based on the total weight of the negative active material.

2. The negative active material of claim 1, wherein the lithium silicide having the I41-a crystalline phase structur e comprises a compound represented by the following Chemical Formula 1:

$$Li_xSi \qquad \text{[Chemical Formula 1]}$$

wherein 0≤x≤4.4.

3. The negative active material of claim 2, wherein 0<x≤1.5 in the above Chemical Formula 1.

4. The negative active material of claim 1, wherein the lithium silicide having the I41-a crystalline phase structure maintains a I41-a crystalline phase structure after the charge and discharge.

5. The negative active material of claim 1, wherein the carbon-based material is included in an amount ranging from 1 wt % to 98 wt % based on the total weight of the negative active material.

6. The negative active material of claim 1, further comprising Si, $Li_{12}Si_7$, $Li_2Si_1$, $Li_7Si_3$, $Li_7Si_2$, $Li_{15}Si_4$, $Li_{22}Si_4$, or a combination thereof.

7. The negative active material of claim 1, wherein the lithium silicide consisting of a I41-a crystalline phase structure is included in an amount of greater than or equal to 10 wt % and less than or equal to 30 wt % based on the total weight of the negative active material.

8. The negative active material of claim 1, wherein the lithium silicide consisting of a I41-a crystalline phase structure is included in an amount of greater than or equal to 10 wt % and less than or equal to 25 wt % based on the total weight of the negative active material.

9. The negative active material of claim 1, wherein the lithium silicide consisting of a I41-a crystalline phase structure is included in an amount of greater than or equal to 20 wt % and less than or equal to 25 wt % based on the total weight of the negative active material.

10. A rechargeable lithium battery comprising:
   a negative electrode comprising the negative active material, the negative active material comprising lithium and a carbon-based material, said lithium silicide consisting of a I41-a crystalline phase structure,
   wherein lithium silicide is included in an amount of greater than or equal to 5 wt % and less than or equal to 50 wt % based on the total weight of the negative active material;
   a positive electrode comprising a positive active material; and
   an electrolyte.

11. The rechargeable lithium battery of claim 10, wherein the positive active material comprises a compound of a metal selected from cobalt, iron, manganese, nickel, molybdenum, and a combination thereof.

12. A negative active material for a rechargeable lithium battery, the negative active material comprising a carbon-based material and lithium silicide consisting of a I41-a crystalline phase structure manufactured by mixing lithium and silicon and milling the mixture, compacting the mixture, and heat-treating the compacted mixture,
   wherein lithium silicide is included in an amount of greater than or equal to 5 wt % and less than or equal to 50 wt % based on the total weight of the negative active material.

13. The negative active material of claim 12, wherein the heat-treatment is performed at a temperature ranging from about 500° C. to about 700° C.

* * * * *